Patented July 1, 1947

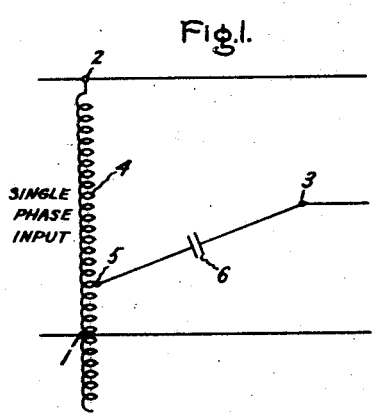
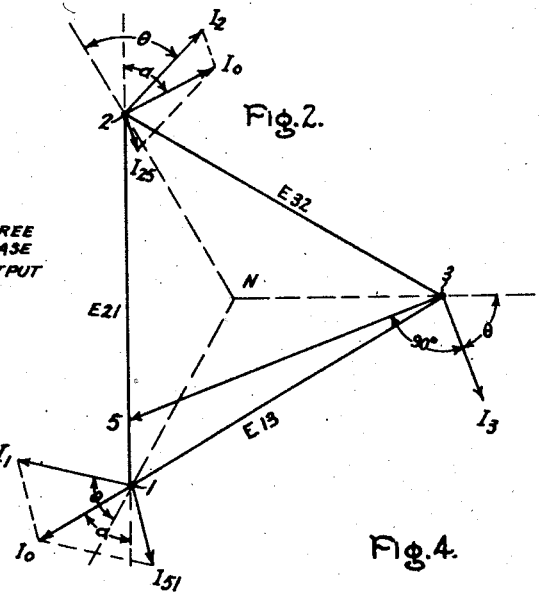
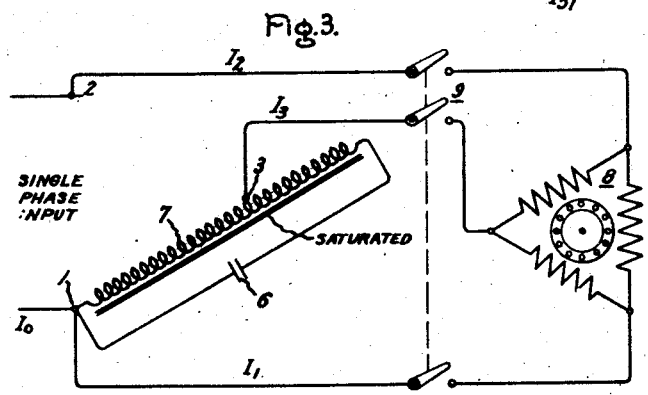
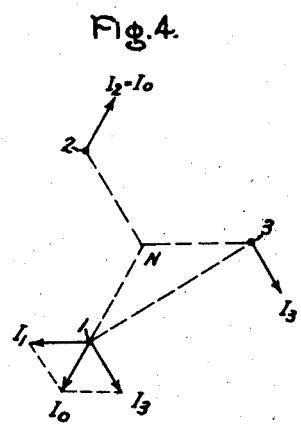
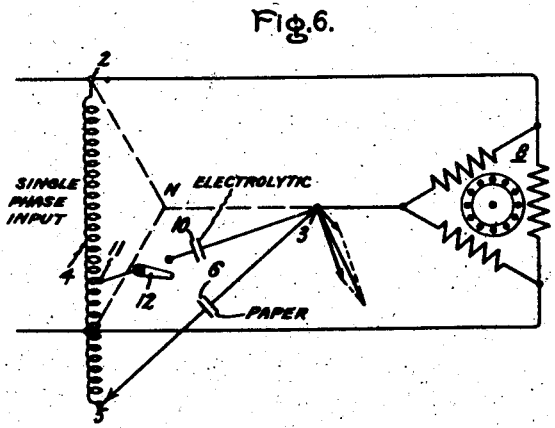
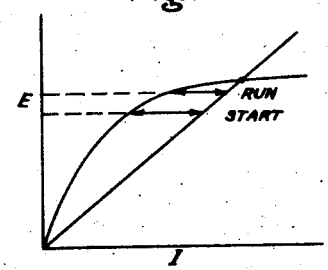

2,423,348

UNITED STATES PATENT OFFICE 2,423,348

PHASE CONVERTER

Thomas T. Short, Fort Wayne, Ind., assignor to General Electric Company, a corporation of New York Application July 12, 1944, Serial No. 544,610

8 Claims. (Cl. 172—238)

This invention relates to phase converters and more particularly to improvements in static networks for splitting a single-phase input into a three-phase output.

In a single-phase system the power flow pulsates between zero and maximum twice every cycle, whereas in a symmetrical polyphase system the power flow is continuous as the power in the separate phases overlaps. Therefore, static systems for obtaining polyphase power from a single-phase source require static energy storage devices, such as a reactor or a capacitor.

In accordance with this invention there is provided a novel and simple static phase converter of the above-mentioned type which is characterized by a higher single-phase input power factor than three-phase output power factor. In accordance with another feature of the invention non-linear reactance means is provided for permitting substantially balanced polyphase operation with varying polyphase load.

An object of the invention is to provide a new and improved phase converter.

Another object of the invention is to provide a simple and inexpensive single-phase-to-three-phase converter.

A further object of the invention is to provide a single-phase-to-three-phase converter which is adaptable for operation with variable three-phase loads.

The invention will be better understood from the following description taken in connection with the accompanying drawing and its scope will be pointed out in the appended claims.

In the drawing Fig. 1 illustrates diagrammatically an embodiment of the invention, Fig. 2 is a vector diagram for explaining the operation of Fig. 1, Fig. 3 is a modification which uses a non-linear net capacitive reactance means, Fig. 4 is a vector diagram for explaining the operation of Fig. 3, Fig. 5 is a pair of volt-ampere characteristic curves for further explaining the operation of Fig. 3, and Fig. 6 is another modification.

Referring now to the drawing and more particularly to Fig. 1, the converter comprises a pair of single-phase input terminals 1 and 2. These input terminals are also two of the three-phase output terminals, the third one of which is terminal 3. A winding 4 which is used as an autotransformer is connected between terminals 1 and 2 and this winding is provided with an adjustable output contact or terminal 5 between which and terminal 3 a capacitor 6 is connected.

The operation of Fig. 1 can best be understood by referring to the vector diagram shown in Fig. 2. In this diagram the terminals 1, 2 and 3 are shown in the same relative positions they occupy in Fig. 1 and it will be noted that they are at the corners of an equilateral triangle. The leg or phase voltages of the three-phase output circuit are shown by dashed lines which extend between a neutral point N and the terminals 1, 2 and 3 respectively. The output currents $I_1$, $I_2$ and $I_3$ of the three phases are shown lagging their respective phase voltages by the angle $\theta$ which is the power factor angle of the load or output circuit. All of the output or load current from terminal 3 must be supplied through the capacitor 6 and the voltage across the capacitor must lead the current $I_3$ by 90 degrees. Therefore, the load power factor angle $\theta$ determines the position of the point 5 on the input voltage vector between terminals 1 and 2. In other words, if the capacitor voltage $E_{35}$ is projected from terminal 3 to the single-phase input voltage vector $E_{21}$, it will intersect $E_{21}$ at point 5.

The capacitor current at point 5 is made up of two components, one of which at terminal 2 is $I_{25}$ and the other of which at terminal 1 is $I_{51}$. Therefore, the input current $I_0$ at terminal 1 is the vector resultant of $I_1$ and $I_{51}$ and the input current at terminal 2 is the vector resultant of $I_2$ and $I_{25}$, and it will be seen that these vectors $I_0$ at terminals 1 and 2 amount to the same current as the vectors are parallel with each other and are of the same length, the opposite direction representing merely that the current at any one instant enters one of the input terminals and leaves the other one. The angle between the input current $I_0$ and input voltage $E_{21}$ is indicated as the angle $\alpha$ and this is the power factor angle of the input and it will be seen that it is a smaller angle than the angle $\theta$ so that the input power factor is higher than the output power factor.

It will be seen from Fig. 2 that if the load power factor angle $\theta$ decreases, then the point 5 must move downwardly in the diagram so as to increase the voltage $E_{35}$ across the capacitor 6 and if the angle $\theta$ becomes less than 60 degrees lagging, then it is necessary to have an extension on the winding 4 so that the point 5 will be below the terminal 1. Such an extension is shown in Fig. 1. The value of the voltage $E_{51}$ between the point 5 and the terminal 1 may be expressed in terms of the input voltage $E_{21}$ and the load power factor angle $\theta$ by the following equation:

$$E_{51} = \left(E_{21}\frac{\sqrt{3}}{2} \text{cotangent } \theta - \tfrac{1}{2}\right)$$

The sine of $E_{51}$ tells whether point 5 is between terminals 1 and 2 or is on an extension of the winding 4 below the terminal 1. If $E_{51}$ is positive the autotransformer 4 is a step-down transformer and point 5 is between terminals 1 and 2, whereas if $E_{51}$ is negative the autotransformer 4 is a voltage step-up transformer and point 5 is on the extended part of the winding and is below terminal 1.

From the above equation it will be seen that when θ is equal to 60 degrees E₅₁ is equal to zero so that point 5 corresponds with terminal 1. Under these conditions the autotransformer winding 4 may be eliminated and such a circuit is shown in Fig. 3. As will be seen from Fig. 3, the terminal 2 then becomes a dummy terminal.

The vector relations of Fig. 3 are shown in Fig. 4 and it will be seen that the current I₃ lags the voltage N₃ by 60 degrees so that the capacitor voltage is the voltage between terminals 1 and 3.

Another feature of Fig. 3 is that the capacitive reactance means is made non-linear. One way of accomplishing this is to connect a winding 7 between terminals 1 and 3 and provide this winding with a saturated magnetic core. The capacitor 6 is connected across the inductive winding 7 and preferably this winding is provided with an extended portion across which the capacitor 6 is connected so as to raise the capacitor voltage.

In Fig. 5 the volt-ampere relations between the capacitor and the inductive winding 7 are shown, the former being a straight line and the latter being curved due to the saturation of its core. The currents in these two elements are directly out of phase with each other so that the net current is the arithmetical difference between their individual currents. They are operated below the intersection point of their characteristics so that the current in the capacitor, as reflected in the input connections to the winding 7, is always greater than the lagging current representing the magnetizing current of the winding 7 and it will be seen that as the voltage across these elements goes up the net capacitive current through them goes down.

In Fig. 3 a three-phase motor 8 is connected to the terminals 1, 2 and 3 by means of a switch 9. When the switch 9 is first closed the motor draws a heavy starting current and the non-linearity of the combination of the capacitor 6 and the winding 7 acts to keep the polyphase system substantially balanced during the heavy starting current conditions as well as during the normal running conditions because the non-linear characteristic or regulation effect of the parallel reactor-capacitor combination is such as to produce a lower voltage drop with higher currents. If only a linear capacitor were used between terminals 1 and 3, then the polyphase output would be unbalanced with changes in load current.

In Fig. 6 the point 5 is shown on the extended part of the autotransformer winding 4 and an additional capacitor 10 is connected to an intermediate point 11 on the winding 4 by means of a switch 12. Such a circuit is particularly well adapted for operation with three-phase motors as the capacitor 6 may be a paper dielectric capacitor having low losses and low kva per unit volume which is for use when the motor is running and which can be adjusted so as to give substantially unit power factor on the single-phase input side of the circuit. Capacitor 10 may be a starting capacitor of the electrolytic type having relatively low power factor. By closing the switch 12 when the motor is started low power factor is eliminated on the input side and also the starting in-rush current is materially reduced on the input side of the circuit. The two capacitor currents are shown in Fig. 6 at right angles to their respective voltages so that when both capacitors are in circuit the current at terminal 3 is the vector sum of the currents in the capacitors 6 and 10 and, as will be seen, this current is larger and more lagging with respect to the phase voltage between the neutral point N and terminal 3 than when capacitor 6 is in the circuit alone.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. A static single-phase-to-three-phase converter comprising, in combination, a pair of single-phase input terminals, three three-phase output terminals two of which correspond to said input terminals, a winding connected between said input terminals, and a pair of capacitors connected between the third output terminal and different points on said winding.

2. A static single-phase-to-three-phase converter comprising, in combination, a pair of single-phase input terminals, three three-phase output terminals two of which correspond to said input terminals, a winding connected between said input terminals, a pair of capacitors connected between the third output terminal and different points on said winding, and a three-phase motor connected to said output terminals.

3. A single-phase-to-three-phase converter comprising, in combination, a pair of single-phase input terminals, three three-phase output terminals two of which correspond to said input terminals, a winding connected between said input terminals, a pair of capacitors connected between the third output terminal and different points on said winding, and circuit controlling means for controlling the connections of one of said capacitors.

4. A static single-phase-to-three-phase converter comprising, in combination, a pair of single-phase input terminals, three three-phase output terminals two of which correspond to said input terminals, capacitive means having at least two terminals one of which is connected to the remaining one of said three-phase terminals, means for connecting another terminal of said capacitive means to a point whose voltage is in phase with the voltage between said pair of input terminals, and means for varying the effective value of said capacitive means.

5. A static single-phase-to-three-phase converter comprising, in combination, a dummy terminal which is common to both the single-phase input and three-phase output sides of said converter, a second terminal which is common to both the single-phase input and three-phase output sides of said converter, a third terminal for the three-phase output side of said converter, and capacitive means connected between said second and third terminals.

6. A static single-phase-to-three-phase converter comprising, in combination, a dummy terminal which is common to both the single-phase input and three-phase output sides of said converter, a second terminal which is common to both the single-phase input and three-phase output sides of said converter, a third terminal for the three-phase output side of said converter, and nonlinear capacitive means connected between said second and third terminals.

7. A static single-phase-to-three-phase converter comprising, in combination, a dummy terminal which is common to both the single-phase input and three-phase output sides of said converter, a second terminal which is common to both the single-phase input and three-phase output sides of said converter, a third terminal for the three-phase output side of said converter, a saturable core autotransformer having its primary winding connected between said second and third terminals, and a capacitor connected across the secondary winding of said autotransformer.

8. A static-phase converter for operating a three-phase motor from a single-phase supply comprising, in combination, a pair of single-phase input terminals, an autotransformer connected between said input terminals, three three-phase output terminals two of which correspond with said input terminals, a continuous duty paper dielectric capacitor connected between the third output terminal and a point on the autotransformer winding, an intermittent duty electrolytic capacitor, and means for connecting said electrolytic capacitor between said third terminal and another point on the autotransformer winding during motor starting and for disconnecting said electrolytic capacitor therefrom during normal operation.

THOMAS T. SHORT.

REFERENCES CITED

The following references are of record in the file of this patent:

UNITED STATES PATENTS

| Number | Name | Date |
| --- | --- | --- |
| 620,989 | Steinmetz et al. | Mar. 14, 1899 |
| 2,243,070 | Cain | May 27, 1941 |
| 2,262,417 | Wolfert | Nov. 11, 1941 |
| 603,778 | Stone et al. | May 10, 1898 |
| 687,078 | Steinmetz | Nov. 19, 1901 |
| 2,359,768 | Kiltie | Oct. 10, 1944 |

FOREIGN PATENTS

| Number | Country | Date |
| --- | --- | --- |
| 518,632 | England | Mar. 4, 1940 |
| 518,000 | England | Feb. 14, 1940 |
| 46,079 | Holland | July 15, 1939 |